(12) United States Patent
Bronstein et al.

(10) Patent No.: US 12,287,295 B2
(45) Date of Patent: Apr. 29, 2025

(54) METHOD FOR ESTIMATING A QUALITY FUNCTION OF A MONO- OR MULTI-LAYERED COATED TRANSPARENT SUBSTRATE

(71) Applicant: SAINT-GOBAIN GLASS FRANCE, Courbevoie (FR)

(72) Inventors: Yaël Bronstein, Paris (FR); Thierry Kauffmann, Pantin (FR); Xavier Caillet, Fontenay (FR); Elsa-Marie Perrin, Paris (FR); Julien Beutier, Montreuil (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 340 days.

(21) Appl. No.: 17/927,578

(22) PCT Filed: May 18, 2021

(86) PCT No.: PCT/EP2021/063151
§ 371 (c)(1),
(2) Date: Nov. 23, 2022

(87) PCT Pub. No.: WO2021/239516
PCT Pub. Date: Dec. 2, 2021

(65) Prior Publication Data
US 2023/0194435 A1 Jun. 22, 2023

(30) Foreign Application Priority Data

May 26, 2020 (EP) .................................... 20315258
May 26, 2020 (EP) .................................... 20315261

(51) Int. Cl.
*G01N 21/84* (2006.01)
*B32B 17/00* (2006.01)
(Continued)

(52) U.S. Cl.
CPC ......... *G01N 21/8422* (2013.01); *B32B 17/00* (2013.01); *C03C 17/36* (2013.01);
(Continued)

(58) Field of Classification Search
CPC .............. G01N 21/8422; G01N 21/31; G01N 2021/8427; G01N 21/84; G06N 20/00;
(Continued)

(56) References Cited

U.S. PATENT DOCUMENTS

2005/0192914 A1* 9/2005 Drege .................. G06N 20/00
706/12
2006/0072807 A1* 4/2006 Bultman ............... G01N 21/47
257/E21.53

(Continued)

FOREIGN PATENT DOCUMENTS

| DE | 10 2018 101173 A1 | 7/2019 |
| WO | WO 2018/215274 A1 | 11/2018 |
| WO | WO 2019/110948 A1 | 6/2019 |

OTHER PUBLICATIONS

International Search Report as issued in International Patent Application No. PCT/EP2021/063151, dated Jul. 21, 2021.

*Primary Examiner* — Dominic J Bologna
(74) *Attorney, Agent, or Firm* — Pillsbury Winthrop Shaw Pittman LLP

(57) ABSTRACT

A computer implemented methods for estimating at least one quality function of a given layered coating on a transparent substrate allows to predict at least one non in-process measured quality function of a given layered coating on a transparent substrate from an in-process measured quality function which can be acquired on the coated substrate as deposited at any location, preferably at the end of a coating process. The method allows to get rid of in-process real-time continuous measurements of quality functions of the coated (Continued)

transparent substrate and real-time monitoring of coating process parameters.

18 Claims, 5 Drawing Sheets

(51) Int. Cl.
    *C03C 17/36*     (2006.01)
    *G01N 21/31*     (2006.01)
    *G05B 19/418*     (2006.01)
    *G06N 20/00*     (2019.01)

(52) U.S. Cl.
    CPC ...... *C03C 17/3618* (2013.01); *C03C 17/3626* (2013.01); *C03C 17/3644* (2013.01); *C03C 17/366* (2013.01); *C03C 17/3681* (2013.01); *G01N 21/31* (2013.01); *G01N 21/84* (2013.01); *G05B 19/41875* (2013.01); *G06N 20/00* (2019.01); *G01N 2021/8427* (2013.01); *G05B 2219/32194* (2013.01); *G05B 2219/45009* (2013.01); *Y02P 90/02* (2015.11)

(58) Field of Classification Search
    CPC ........... G05B 2219/32194; G05B 2219/45009; G05B 19/41875; Y02P 90/02; B32B 17/00; C03C 17/36; C03C 17/3618; C03C 17/3626; C03C 17/3644; C03C 17/366; C03C 17/3681
    See application file for complete search history.

(56) References Cited

U.S. PATENT DOCUMENTS

| | | | | |
|---|---|---|---|---|
| 2007/0258093 | A1* | 11/2007 | Sieck | G01N 21/55 356/446 |
| 2019/0354019 | A1* | 11/2019 | Freytag | G03F 1/74 |
| 2020/0033820 | A1* | 1/2020 | Furuya | G06N 20/00 |

\* cited by examiner

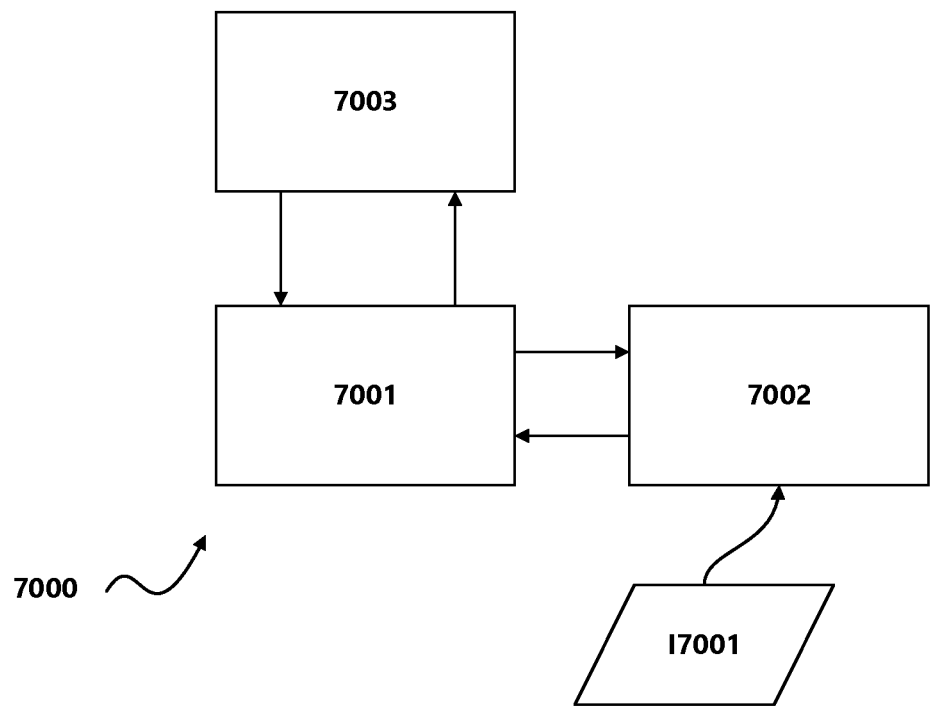
Fig. 7
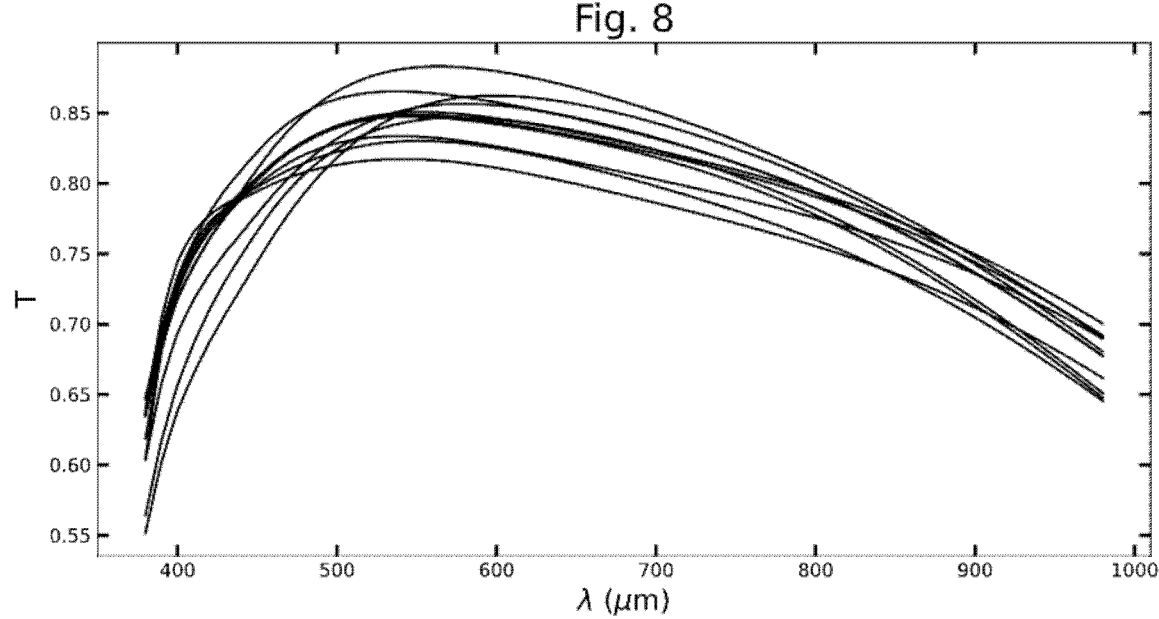

METHOD FOR ESTIMATING A QUALITY FUNCTION OF A MONO- OR MULTI-LAYERED COATED TRANSPARENT SUBSTRATE

CROSS-REFERENCE TO RELATED APPLICATIONS

This application is the U.S. National Stage of PCT/EP2021/063151, filed May 18, 2021, which in turn claims priority to European patent application number 20315258.2 filed May 26, 2020 and European patent application number 20315261.6 filed May 26, 2020. The content of these applications are incorporated herein by reference in their entireties.

TECHNICAL FIELD

The invention pertains to computer implemented methods for estimating at least one quality function of a given layered coating on a transparent substrate.

BACKGROUND ART

Mono- or multi-layered coatings are used to functionalize surfaces of a wide range of substrates, particularly transparent substrates such as mineral or organic glasses. Such coatings provide optical properties and/or functionalities to glazings that suit specific applications.

For example, in the building industry, surfaces of transparent glass sheets are often coated with multi-layered low-emissivity or solar control coatings. Such coatings are stacks of a plurality of chemically and physically, e.g. amorphous, crystallized or partially crystallized, different thin layers which interact with each other and alter the incident solar radiation falling on the surfaces of the glass panes.

These coatings often contain infrared-reflective metallic layers, mainly made of metals such as silver, gold, niobium or copper, to reduce heat and/or radiation transfer through the panes. They are often combined with dielectric layers, mainly through sandwiching configurations, in order to counterbalance or adjust colour shifts, reflection and/or transmission effects that are due to said metallic layers, and to provide the sought solar factor or heat emission rate, also called emissivity. Other layers, either metallic of dielectric, may also be used in the coating to improve thermal and/or structural stability over time, during use, or upon subsequent transformations such as heating, tempering and/or bending.

Coating processes to deposit mono- or multi-layered coating on substrates are well-known in the art. For instance, in glass industry, a stack of thin layers is generally coated on a transparent mineral glass substrate by the successive deposits of each thin layer by conveying the glass substrate through a succession of deposit cells adapted to deposit a given thin layer.

The deposit cells may use different deposit methods such as magnetic field assisted sputtering (also called magnetron sputtering), ion beam assisted deposition (IBAD), evaporation, chemical vapour deposition (CVD), plasma-enhanced chemical vapour deposition (PECVD), low pressure chemical vapour deposition (LPCVD).

In order to ensure that the coated substrates fulfil certain requirements regarding one or several quality functions, quality controls have to be carried out before starting production, i.e. during setup time, and during the production. Quality functions may be, for example, optical, mechanic and/or physicochemical properties, such as solar gain, light transmission, light reflection, color, chemical and/or mechanical resistance, e.g. scratch.

It is a common practice to carry out offline quality controls by measuring quality functions, e.g. optical, mechanical and/or physicochemical properties, on collected samples during or at the end of the coating process. Such measurements are usually destructive. First, samples has to be cut from the coated substrates during the setup time and/or the production, and then analysed with measuring instruments that are often not available close to the process or not adapted for an in-process use. In some cases, the samples may have also to undergo further transformation, e.g. lamination, heating, tempering, before to be analysed.

It is known in the prior art, for example in WO 2019110948 A1, WO 2018215274 A1, DE 102018101173 A1 or WO 2019/110948 A1, to use feedback methods that implement one or several feedback loops for real-time control and/or adjustment of the parameters of a deposit system or of deposit cells in function of shifts in values of selected quality functions, e.g. optical, mechanical and/or physicochemical properties, of the deposited coating. These methods are often called online methods as they rely on in-process real-time monitoring of parameters of the deposit system or deposit cells, and on in-process continuous real-time measurements of quality functions of the coating at different stages during the coating process.

SUMMARY OF THE INVENTION

Technical Problem

Regarding offline quality controls, main disadvantages are production losses from product destruction, disruption and lag times between measurement and correction of process parameters.

Regarding online feedback methods, they may often require real-time collection and processing of high amounts of data, either for the feedback loops to work and/or to train the underlying algorithms. The collected data is usually a mix of parameters from different components of the coating system or the cells and of quality functions, e.g. optical, mechanical and/or physicochemical properties, of the coated substrates. In order to collect these data, coating systems are often instrumented with various high throughputs sensors and measuring devices, e.g. high data acquisition chips, I/O electronic devices, programmable logic controllers, pressure sensors, temperature sensors, vacuum sensors, gas sensors, speed rate sensors, spectrometers, ellipsometers, sheet resistivity probe systems, optical interferometers or similar devices. Such instrumentation may be very expensive and not easy to implement on existing deposit system or cells.

In feedback loops, the relevance of parameters of the deposit system or cells to be monitored is a prerequisite which has to be correctly assessed or evaluated. Otherwise said feedback loops may not work efficiently and may event fail to control and/or adjust the parameters for the manufacturing of the desired coating. To overcome this hurdle, a common strategy is to use more parameters than what is really needed in order to avoid missing relevant parameters which were not initially considered in the assessment process. Such approach may be sometimes a flaw since it may lead to an increase of the amount of irrelevant data to collect and process, which in turn leads to an undue workload on computing facilities.

Furthermore, because some instruments that are adapted to measure some relevant quality functions may not be always available close to the process or compatible for an in-process use, these quality functions may only be measured offline, i.e. off the coating system, through destructive tests to be carried on samples regularly collected during the production. Only after these tests have been performed, be the related data fed back into the feedback algorithms. Losses from product destruction, disruption and lag times between measurement and correction of process parameters may occur.

Another limitation of online feedback methods is their lack of versatility. An online feedback method which is trained on data which may be relevant for a given coating process and for a given stack of layers, e.g. given thicknesses and chemistries, cannot be transferred to the same process or another process in which a different coating is deposited. A negative consequence for business is that data or trained algorithms from existing coating processes cannot be re-used for exploitation of a new coating process. A low optimisation of available data and algorithms may be considered as wasted resources. A company may then incur extra costs for new development of online feedback loops.

Therefore, there is a need for a method which can predict or estimate at least one quality function of a given mono- or multi-layered coating on a transparent substrate without delay, e.g. without waiting results from quality controls and/or without relying only on adjustment of the coating process parameters through online feedback methods. Advantageously, the method may also be versatile and may help to reduce the amount of data to be collected, for example, such as in online feedback methods.

Solution to Problem

According to a first aspect of the invention, there is provided a computer implemented method as described in claim 1, dependent claims being advantageous embodiments.

More specifically, the method according to the invention allows to predict at least one non in-process measured quality function of a given layered coating on a transparent substrate from an in-process measured quality function which can be acquired on the coated substrate as deposited at any location, preferably at the end of a coating process.

In the scope of the invention, a quality function, either measured, simulated, in-process or non in-process, shall not be interpreted as a mathematical function. As it will be more apparent in the description of detailed embodiments, 'quality function' is used as a generic expression which relates to physical features, optical, electrical, mechanical or electrical properties of the coated transparent substrate.

According to some aspects of the invention, there is provided a data processing system and a computer programme to implement a method according to the first aspect of the invention.

According to another aspects of the invention, there is provided a coating process of a layered coating on a transparent substrate in which a method according to the first aspect of the invention is used to estimate a non in-process measured quality function of the coated transparent substrate.

Advantages of the Invention

A first advantageous feature of the method according to the first aspect of the invention is its ability to predict or estimate at least one non in-process measured quality function of a given layered coating on a substrate from an in-process measured quality function. The in-process measured quality function may be acquired on the coated substrate at some location, preferably at the end, of the coating process or system.

Comparing to existing online feedback methods, the method according to the first aspect of the invention does not solely rely on in-process real-time monitoring of data related to process parameters of the deposit system or deposit cells, and/or of data related to quality functions of the coated transparent substrates. The amounts of data to be collected and processed may be then reduced. This may also save costs as less or no instrumentation of the coating process is needed for online in-process collection of data.

In a sense, the invention may allow to get rid of in-process real-time continuous measurements of quality functions of the coated transparent substrate and real-time monitoring of coating process parameters.

Another advantage of the method according to the first aspect of the invention is that it may be integrated as a complementary component, e.g. plug-in, add-on or extension, into an online feedback method to provide, for instance, a supervising function. A supervising function may be useful to ensure that the online feedback method is working efficiently and/or detect quickly any possible drift during the coating process.

Another benefit of the invention is that the sets of training and target data may contain mostly, preferably only, data for relevant parameters of the deposit system or cells. This may contribute to reduce the workload on data processors and data storage facilities. For example, most existing deposit system or cells are often associated to a data history stored as a data lake or a data warehouse. The data history may contain more or less structured batches of data or streaming data relating to parameters of the coating processes and quality functions of the coated substrates produced with these coating processes. They may be advantageously exploited to assess the relevance of process parameters and help to keep only those that allow to efficiently tune the mathematical model during the training of the machine learning based regression analysis.

Another important benefit of the invention is its versatility and adaptability. A method according to the first aspect of the invention which is already implemented for a given coating process may be transferred to another one without or with few adjustments. For instance, when the method is already implemented for a given coating process and a given coated substrate, it may be rightly transferred to some or another coating to produce another or same coated substrate respectively without or with few adjustments. In other words, the method may not necessarily require a new training session before to be implemented for another coating process and/or for another coated substrate. Same sets of training and target data, or same mathematical models may be used with a good confidence. This may allow to benefit from data or trained algorithms from existing coating process for the exploitation of a new coating process This may contribute to a better optimisation and managing of data and algorithms resources for a company.

Without being an explanation, this versatility may be partly due to the fact that non in-process measured quality functions of the coated substrate are often independent from the coating process itself, as long as the coated product may be produced indifferently from any coating process.

Another outstanding advantage of the method according to the first aspect of the invention is that it may allow not to be bound to parameters of the coating process used to produce the coated substrate. Then, there may be no need to provide as input a parameter of the coating process in which the coated substrate is produced. In other words, the method of invention may be able to estimate or predict at least one optical and/or physicochemical property of given coated substrate independently of the coating process.

This should not be interpreted strictly as if no coating process parameter may be provided as input to the method according to the invention. As it will be apparent in detailed embodiments, for some applications, high levels of accuracy and precision for the output may not be obtained only from quality functions provided as input, or quality functions that need to be provided as input may not be easily determined and/or measured. Providing coating process parameter as input may be advantageous to alleviate this problem. In that case, the set of training data may comprise coating process parameters.

An outstanding advantage of the invention is that the quality functions may be quality functions of thermally and/or mechanically processed or non-processed coated transparent substrates. For instance, the quality functions may relate to the coated transparent substrate as produced at the exit of the coating process or to the coated transparent substrate after further processing as tempering or lamination, without that this processing be really carried out in said coating process. They may even relate to a coated transparent substrate wherein the transparent substrate is different from the transparent substrate currently used in production.

Measurement of the capability of a coating process often requires time consuming and destructive tests that cannot be carried out on all the coated transparent substrates being produced. An advantage of a method according to the first aspect of the invention is that it may help to assess or improve the capability of a coating process, i.e. the repeatability and the consistency of the process in terms of specification limits for the produced coated substrates. It is non-destructive and may be used to estimate or predict quality function of all the coated transparent substrates being produced in the coating process.

Another advantage of the invention is that it may also help to detect drifts in the coating process by using real-time monitored data as input data. The drifts may be detected relatively early to avoid product out of specifications.

BRIEF DESCRIPTION OF DRAWINGS

FIG. 7 is a physical data flow diagram of a processing data system.

FIG. 8 is a data plot of solar light transmission spectra of 10 samples of coated substrates randomly selected from 1000 simulated samples of coated substrates.

DETAILED DESCRIPTION OF EMBODIMENTS

Figure 1:
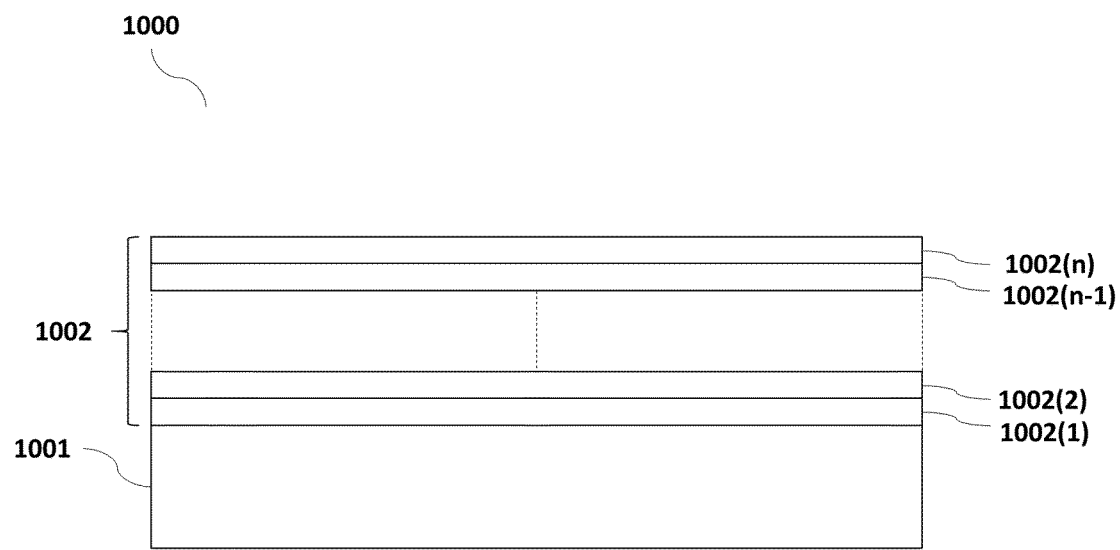
FIG. 1 is a schematic representation of layered coating on a substrate.

With reference to FIG. 1, a common coated transparent substrate 1000 may comprise a transparent substrate 1001 with a layered coating 1002 on one of its main faces. The coating 1002 may be a mono-layered, i.e. comprising only one layer 1002(1) or a multi-layered coating, i.e. comprising several layers 1002(1)-1002(n).

The coating 1002 may be a multi-layered coating comprising at least one dielectric layer and one functional metallic layer. For instance, for building or automotive glass application, the functional layer may be an infrared-reflective metallic layers, mainly made of metals such as silver, gold, niobium or copper, to reduce heat and/or radiation transfer through the transparent glass panes. There may be more than one functional, e.g. two, three or more functional layer, eventually combined with dielectric layers, mainly through sandwiching configurations. The dielectric layers may help to counterbalance or adjust colour shifts, reflection and/or transmission effects that are due to said metallic layers, and to provide the sought solar factor or heat emission rate, also called emissivity.

The coating may also comprise other layers, either metallic of dielectric, to improve thermal and/or structural stability over time, during use, or upon subsequent transformations such as heating, tempering and/or bending.

The substrate 1001 may be a transparent substrate such as a mineral glass substrate or an organic substrate. In the context of the invention, a transparent glass means a glass through which at least part of electromagnetic radiation is transmitted in the visible spectrum so that the shape and possibly some details of an object which is observed through that said glass can be distinguished. The substrate may be a thin, rigid or flexible, substrate.

A transparent glass may be an organic or mineral glass. Examples of mineral glass are sodalime glass, aluminosilicate glass or borosilicate glass. Examples of organic transparent glass are poly(methyl methacrylate) (PMMA) or polycarbonate (PC) polymers With reference to FIG. 2, a deposit process 2000 may be illustrated by a deposit system comprising juxtaposed cells through which a transparent substrate 2001 is successively conveyed. The deposit system may comprise an input cell 2002 into which the transparent substrate enters, a first buffer cell 2003, a deposit section 2004, a second buffer cell 2005 and an output cell 2007 from which exits the coated substrate 2007. The deposit section 2004 may comprise two transfer cells 2004a, 2004c and a succession 2004b of deposit cell, $E_{i, i=1, \ldots N>1}$. Each deposit cell $E_i$ may be featured with means for depositing coating, e.g. magnetic field assisted sputtering (also called magnetron sputtering) system, ion beam assisted deposition (IBAD) system, evaporation system, chemical vapour deposition (CVD) system, plasma-enhanced chemical vapour deposition (PECVD) system or low pressure chemical vapour deposition (LPCVD) system. Deposit cells $E_i$ may also comprise pumping systems to create the vacuum conditions that suit deposition.

Common deposit process 2000, particularly those that used online feedback methods to control and/or adjust the parameters of a deposit process, may comprise various sensors and measuring devices (not shown) implemented at various locations in cells of the deposit system in order to monitor the coating process parameters and/or measure quality functions of the coating at different stages of the coating process. In particular, measuring devices may be located at the exit of each or several deposit cells $E_i$ in order to measure quality functions such as optical and/or physicochemical properties of the coating after deposit of each or several layers.

Different sensors may be used to monitor coating process. They may be, for instance, I/O electronic devices, high data acquisition chips, programmable logic controller, pressure sensors, temperature sensors, vacuum sensors, gas sensors, speed rate sensors. Measuring instruments may be used to monitor optics, mechanics, energetics, chemistry of the coated transparent substrate. They may be, for instance, optical spectrometers, ellipsometer, surface resistivity probe systems, optical interferometers, or automated mechanical or chemistry probes.

Figure 2:
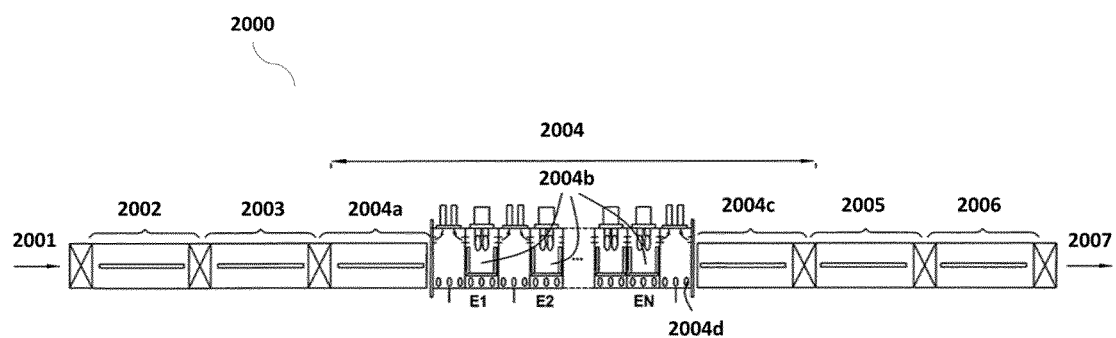
FIG. 2 is a schematic representation of a coating process to deposit mono- or multi-layered coating on a substrate.
Figure 3:
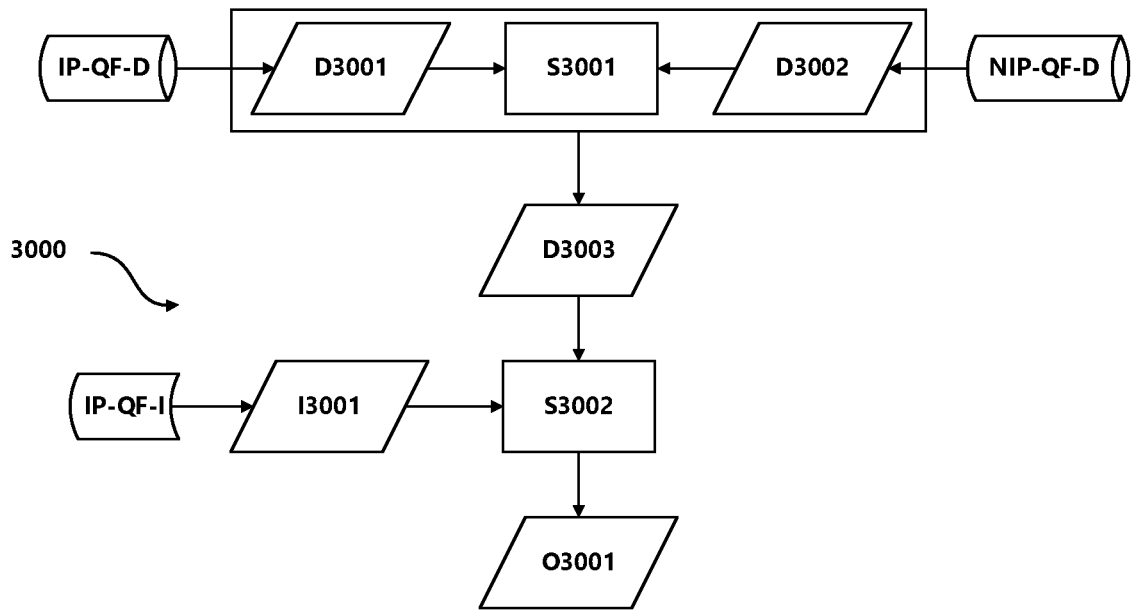
FIG. 3 is a logical data flow diagram of a first embodiment of a computer implemented method according to the first aspect of the invention.

With reference to FIGS. 1 to 3, in an embodiment of the first aspect of the invention, there is provided a computer implemented method 3000 for estimating at least one non in-process measured quality function of a given coated transparent substrate 1000 wherein said given coated transparent substrate 1000 comprises a transparent substrate 1001 with a layered coating 1002 on at least one of its main faces, said coating 1002 being deposited with a given coating process 2000, wherein said method uses, as input data I3001, at least one in-process measured quality function IP-QF-I of the transparent coated substrate 1000 as deposited, and provides, as output data O3001, at least one non in-process measured quality function of said given coated substrate 1000, wherein said non in-process measured quality function is calculated from said input data I3001 using a mathematical model D3003, wherein said mathematical model D3003 is computed from a machine learning based regression analysis S3001 which is trained on a set of training data D3001 comprising in-process measured and/or simulated quality functions IP-QF-D and a set of target data D3002 comprising non in-process measured and/or simulated quality functions NIP-QF-D, wherein said in-process measured quality functions IP-QF-D of the set of training data D3001 and said non in-process measured and/or simulated quality functions NIP-QF-D of the set of target data D2002 are respectively in-process measured and/or simulated quality functions IP-QF-D and non in-process measured and/or simulated quality functions NIP-QF-D from previous coated transparent substrates which comprise transparent substrates and layered coating similar to those of to the given coated transparent substrate 1001 respectively, said given layered coating 1002 being deposited in the given coating process 2000, wherein said in-process measured and/or simulated quality functions IP-QF-D of said set of training data D3001 and said non in-process measured and/or simulated quality function NIP-QF-D of said set of target data D3002 are respectively the same kind as the in-process measured quality function IP-GF-I provided as input I3001 and non in-process measured quality function NIP-QF-D provided by said method as output O3001.

In the method, the data provided as input I3001 and as output O3001 are the same kind as those in the sets of training D3001 and target D3002 data. This is a common prerequisite of most machine learning based regression analysis. The training D3001 and target D3002 data are related to previous, i.e. past produced, coated substrates and to previous, similar or current coating process which have mainly same features, i.e. quality functions for the coated substrate and technical characteristics for the coating process, as those of the coated substrate and coating process whose data are provided as input I3001 and output O3001.

As an illustrative example, assuming that the method is configured to provide as output O3001 a non in-process measured quality function such as an optical property, e.g. solar gain or light transmission, and/or such as a physicochemical property, e.g. electrical resistivity or the refractive index, of a coated substrate, the target data D3002 comprises also the same non in-process measured quality functions NIP-QF-D, i.e. in this instance optical and/or physicochemical properties, from previous, i.e. past produced, coating substrates whose features are similar, or same, as those of the coated substrate whose data is provided as output O3001, i.e. predicted or estimated, by the method.

As discussed previously, the method of the invention has main advantage to allow to estimate or predict non in-process measured quality functions of a given layered coating 1002 on a transparent substrate 1001 from an in-process measured quality function which can be acquired on the coated substrate at any location, preferably the end, of a coating process 2002, and without measurement of that quality functions during the coating process itself. It may prevent from a continuous monitoring, collection and processing of large amount of real-time in-process data related to parameters of the coating system or cells during the coating process and properties of the coated substrate. The workload of data processors and data storage may then be reduced.

Further, the method may be used as not being bound to any parameters of the coating process to produce the coated substrate. Therefore, there may be no need to provide as input a parameter of the coating process with which the coated substrate is produced, and the method according to the invention may be able to estimate or predict at least one non in-process quality function independently of the coating process.

However, as explained previously, this should not be interpreted strictly as if no coating process parameter may be provided as input to the method according to the invention. For some applications, high levels of accuracy and precision for the output may not be obtained only from a quality function provided as input, or the efficient quality function to be provided as input may not be easily determined and/or measured. Therefore, the use of coating process parameter may be advantageous.

Figure 4:
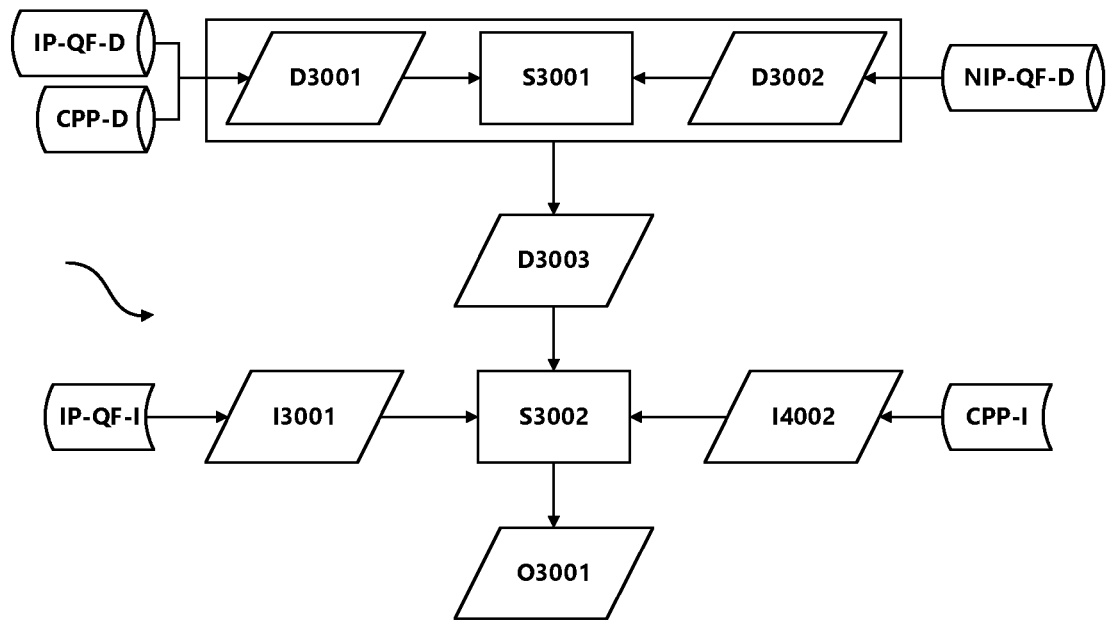
FIG. 4 is a logical data flow diagram of a second embodiment of a method according to the first aspect of the invention.

Accordingly, with reference to FIG. 4, in a certain embodiment of the method according to the first aspect of the invention, there is provided computer implemented method 4000 for estimating at least one non in-process measured quality function of a given coated transparent substrate 1000 wherein said coated transparent substrate 1000 comprises a transparent substrate 1001 with a layered coating 1002 on at least one of its main faces, said coating 1002 being deposited with a given coating process 2000, wherein said method 4000 uses, as input data I3001, I4002, at least one in-process measured quality function IP-QF-I of the coated transparent substrate 1000 as deposited and at least one coating parameter CPP-I of said given coating process 2000, and provides, as output data O3001, at least one non in-process measured quality function of said given coated substrate 1000, wherein said non in-process measured quality function is calculated from said input data I3001, I4002 using a mathematical model D3003, wherein said mathematical model D3003 is computed from a machine learning based regression analysis S3001 which is trained on a set of training data D3001 comprising in-process measured and/or simulated quality functions IP-QF-D and coating process parameters CPP-D of the given coating process 2000 and a set of target data D3002 comprising non in-process measured and/or simulated quality functions NIP-QF-D, wherein said in-process measured and/or simulated quality functions IP-QF-D of the set of training data D3001 and said non in-process measured and/or simulated quality functions NIP-QF-D of the set of target data D2002 are respectively in-process and/or simulated measured quality functions IP-QF-D and non in-process measured and/or simulated quality functions NIP-QF-D from previous coated transparent substrates which comprise transparent substrates and layered coating similar to those of to the given coated transparent substrate 1001 respectively, said given layered coating 1002 being deposited in the given coating process 2000, wherein said in-process measured and/or simulated quality functions IP-QF-D of said set of training data D3001 and said non in-process measured and/or simulated quality function NIP-QF-D of said set of target data D3002 are respectively the same kind as the in-process measured quality function IP-GF-I provided as input I3001 and non in-process measured quality function NIP-QF-D provided by said method as output O3001, wherein said coating process parameters CPP-D of the given coating process of said set of training data D3001 are coating parameters from previous monitoring of said given coating process 2000 during the coating of said previous coated transparent substrates, and wherein said coating parameters CPP-D are of the same kind as the at least one coating parameter CPP-I provided as input data 14002.

The data provided as input I3001, 14002 and as output O3001 are the same kind as those in the sets of training D3001 and target D3002 data. This is a common prerequisite of most machine learning based regression analysis. The training D3001 and target D3002 data may be related to previous, i.e. past produced, coated substrates and to previous, similar or current coating process which have mainly same features, i.e. quality functions for the coated substrate and technical characteristics for the coating process, as those of the coated substrate and coating process whose data are provided as input I3001, 14002 and output O3001.

As an illustrative example, assuming that partial pressure of some gases in deposit cells of the coating process is provided as coating process parameters CPP-I as input data 14002, the training data D3001 comprises also partial pressures of those gases for same or similar coating process as coating process parameters CPP-D.

In some embodiments, the coating process parameters CPP-D, CCP-I may be selected so that they are not based on intrinsic technical components of the deposition system itself, such as electrical or electronic circuitries, power supplies or the like, but on outputs of the deposit system that determine the coating conditions and/or have a contribution to the optical and/or physicochemical properties of the coated substrates.

The coating process parameters, CPP-D, CPP-I, may be partial pressures of gases, e.g. levels of water, oxygen, nitrogen or inert gases, cathode power set point or actual value, cathode voltage set point or actual value, magnetic fields, gas flows, gas partial pressures, gas total pressure, mechanical shields arrangement, geometric arrangement of magnetic devices, plasma emission and/or conveying speed of the substrates.

For transparent substrates coated with thin film layers that may comprise metallic functional layers, the coating process parameters, CPP-D, CPP-I may advantageously be the levels of gas that may contribute to the oxidation state of the layers, and the deposition powers, deposit times, and/or conveying speed of the substrates that may contribute to the thickness and crystallinity of the layers.

The embodiments, herein described in the context of the FIG. 4, may be advantageously combined with other embodiments described hereinafter.

Non in-process quality functions that may be estimated or predicted by the method according to the first aspect of the invention may relate to optics, mechanics, energetics, chemistry or application compatibility criteria, e.g. Head Up Display compatibility, of the coated transparent substrate. For examples, they may be thickness, chemical composition, electrical resistivity and/or complex refractive index of the layers in the coating, mechanical and/or chemical resistance of the layer(s) in the coating and/or of the substrate, and/or optical properties, e.g. solar gain, light transmission coefficient, light reflection coefficient, or colour, of the coated substrate, and the homogeneity thereof as well.

The in-process measured quality function IP-QF-I may be an optical, electrical, mechanical or electrical property. In particular, it may be a transmission and/or reflection electromagnetic spectrum. The electromagnetic spectrum may be transmission and/or reflection spectrum, acquired either on the coated side or on the non-coated side of the substrate. In particular, the electromagnetic spectrum may be advantageously transmission and/or reflection spectra with an observation angle equal to or less than 10° or with an observation angle more than 45° in the 295 nm-2000 nm, preferentially in 330 nm-1100 nm wavelength range. Surprisingly, the amount of information which may be contained in such electromagnetic spectra are often enough for the method to work efficiently and accurately. The amount of data to be processed is again usefully reduced.

The method according to the first aspect of the invention may be adapted to estimate or predict non in-process quality functions of coating deposited on transparent substrates such as mineral glass substrates or organic substrates. The coating may be a mono- or multi-layered coating. In particular, it may be a multi-layered coating comprising at least one dielectric layer and one functional layer. The functional layer may be an infrared-reflective metallic layers, mainly made of metals such as silver, gold, niobium or copper, to reduce heat and/or radiation transfer through the transparent glass panes.

The coated transparent substrates may be part of a glazing, such as a double or triple insulated glazing, a laminated glazing. In this case, the non in-process measured quality function may be a quality function of the glazing in which the coated substrate is incorporated.

The method according to the first aspect of the invention may also accept as input data 13002 physicochemical properties of the substrate 2001 and/or the layered coating 2002.

Figure 5:
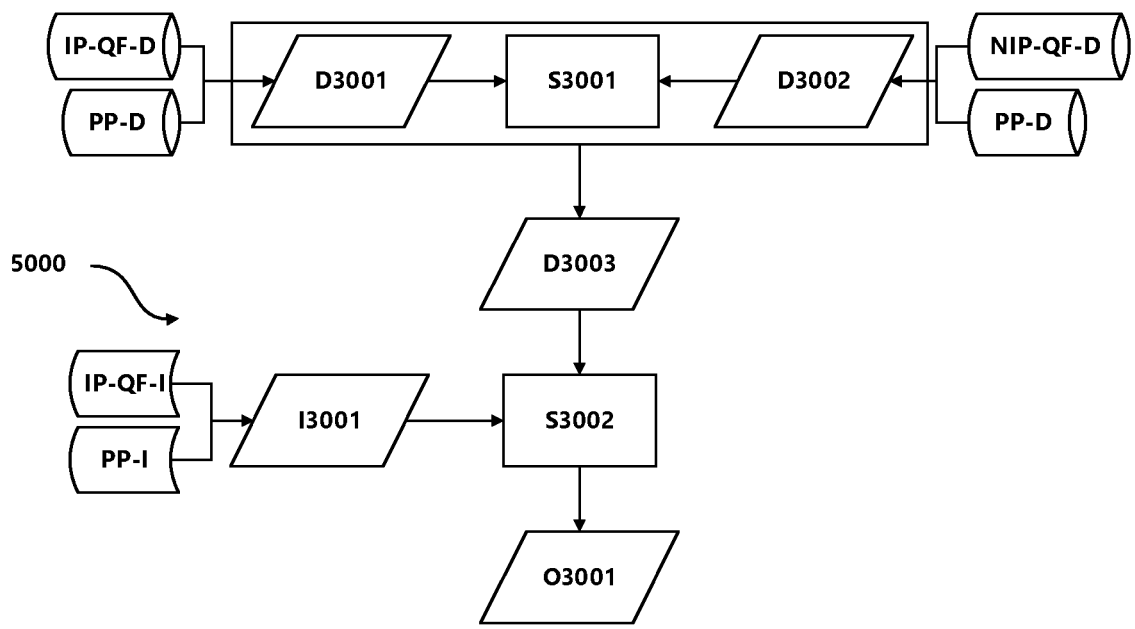
FIG. 5 is a logical data flow diagram of a third embodiment of the method according to the first aspect of the invention.

With reference to FIG. 5, in a certain embodiment of the first aspect of the invention, the computer implemented method 5000 may further use as input I3001 at least one physicochemical property PP-I of the transparent substrates 2001 and/or the layered coating 2002, and wherein said set of training data D3001 further comprises physicochemical properties PP-D of same kind as the physicochemical property PP-I provided as input I3001. This embodiment may help to refine the mathematical model computed from a machine learning based regression analysis regarding to some quality functions of the coated transparent substrate provided as output data.

Examples of physicochemical properties PP-I may be the thickness of the layer(s) of the coating, the chemistry, electrical resistivity or the refractive index of the layer(s) of the coating and/or substrate.

Data in the set of training data D3001 and target data D3002 may be simulated and/or measured data. Worthwhile examples of sets of training and target data may be already available measured data history of parameters of the coating process and of quality functions of the coated transparent substrate, and simulated data, alone or in combination.

Simulated data may be advantageous when the available real, i.e. measured/monitored data are scarce and/or unreliable. The use of simulated data may be highly advantageous when measured data are not available or insufficient to efficiently compute a mathematical model from a machine learning based regression analysis.

One way to assess the reliability of data may be to train the machine learning based regression analysis on the data and then to evaluate the performances of the training with adapted mathematical tools. The art may provide many mathematical tools to carry out such evaluation. Also, models of machine learning regression analysis may be often packaged with adapted mathematical tools to evaluate their performances.

Any valuable physical mathematical models available in prior art may be used to simulate data as long as it is relevant for the coated substrate and the coating process.

Physical and/or mathematic models of quality functions, e.g. optics, mechanics, energetics, chemistry, of coating to simulate data are well-known in the art, in particular for thin films coating. Examples of models are CODE from WTheiss Hardware and Software, TFCalc from Software spectra inc., OptiLayer from Thin Film Software or Essential Macleod from Thin Film Center.

Figure 6:
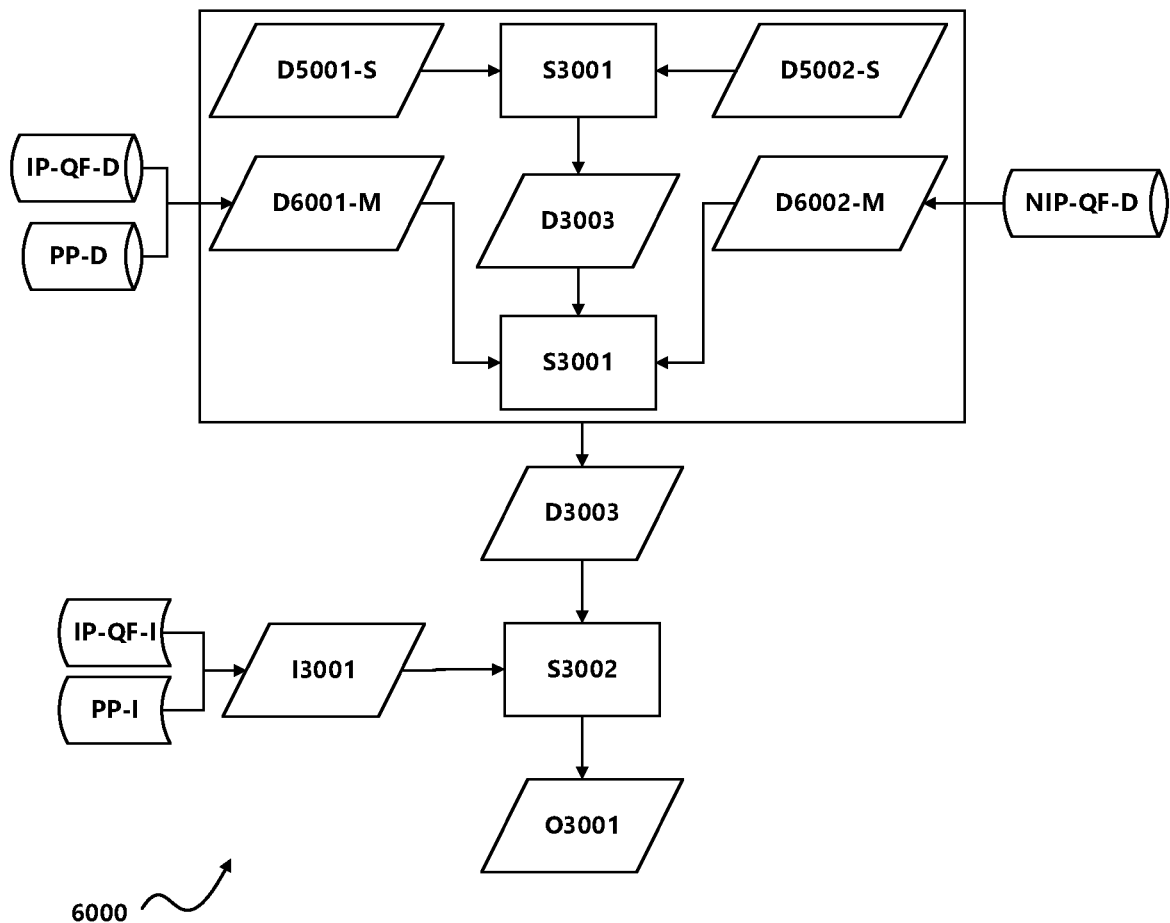
FIG. 6 is a logical data flow diagram of a fourth embodiment of the method according to the first aspect of the invention

In this context, an advantageous and efficient way to exploit simulated data may be to combine simulated and measured data through a two-step training of the machine learning based regression analysis S3001. According to an embodiment of the invention, with reference to FIG. 6, the mathematical model D3003 in the method 6000 may be computed from a machine learning based regression analysis which is, first, trained on a set of simulated training data D6001-S and a set of simulated target data D6002-S, and which is, then, trained again on a set of measured training data D6001-M and a set of measured target data D6002-M.

Various supervised machine learning based regression analysis may be used to compute the mathematical model D3003. For example, it may be a Ridge regression, a Random Forest regression, a decision tree regression, a gradient boosting regression, a support vector machine regression, a Lasso regression or a neural network based regression analysis. Many programming and software resources or modules are available in the prior art. For example, if all or part of the method according to invention is computer implement in Python programming language, Scikit-learn, Keras or TensorFlow modules may provide useful and ready to use API for machine learning algorithms.

The method of the invention is computer implemented. Accordingly, with reference to FIG. 7, in another aspect of the invention, there is provided a data processing system 7000 comprising means for carrying out the method according to any of the embodiments described herein. Example of means for carrying out the method may be a device 7001 which may be instructed to carry out sequences of arithmetic or logical operations automatically to perform tasks or actions. Such device, also called computer, may comprise one or more Central Processing Unit (CPU) and at least a controller device that may be adapted to perform those operations. It may further comprise other electronic components 7003 like input/output interfaces, non-volatile or volatile storages devices, and buses that are communication systems for the data transfer between components inside a computer, or between computers. One of the input/output devices may be an user interface for human-machine interaction, for example graphical user interface to display human understandable information.

Another aspect of the invention is to provide a computer program 17001 comprising instructions which, when the program is executed by a computer, cause the computer to carry out the method of the invention according to any embodiments described herein.

Any kind of programming language, either compiled or interpreted, may be used to implement the steps of the method of the invention. The computer program may be part of a software solution, i.e. part of a collection of executable instructions, code, scripts or the like and/or databases.

Another object of the invention is to provide a computer-readable medium 7002 comprising instructions which, when executed by a computer, cause the computer to carry out the method according to any of the embodiments described herein.

The computer-readable storage 7002 may be preferably a non-volatile storage or memory, for example hard disk drive or solid-state drive. The computer-readable storage may be removable storage media or a non-removable storage media as part of a computer.

Alternatively, the computer-readable storage may be a volatile memory inside a removable media. This may ease the deployment of the invention into many production sites.

The computer-readable storage 7002 may be part of a computer used as a server from which executable instructions can be downloaded and, when they are executed by a computer, cause the computer to carry out a method according to any of the embodiments described.

The method of the invention may be implemented in a coating process of a layered coating. It may be implemented either as an online feedback method or part of an online feedback method, or, more advantageously as an offline method. Thus, according to another aspect of the invention, there is provided a coating process 2000 of a layered coating 1002 on a transparent substrate 1001, wherein a given layered coating 1002 is coated on a transparent substrate 1001, wherein at least one non in-process measured quality function of the coated transparent substrate is estimated with a method 3000,4000,5000,6000 according to any according to any embodiments or aspects described herewith, and wherein at least one in-process measured quality function IP-QF-1 of the coated substrate acquired at any location, preferably at the end, of the coating process 2000 is provided as input data I3001 to said method 3000,4000,5000,6000. In this aspect, the method may be advantageously used to automate a coating process in order to correct drifts from target optical and/or physicochemical properties and ensure that the requirements in this respect are continuously met. This process may be well adapted to help to assess or improve the capability of a coating process, in particular a coating process of thin films stack on glass substrate for the glass building or automotive industry.

It is now provided an illustrative example embodiment of the method according to the invention in order to illustrate and demonstrate its benefits.

The example is a computer implemented methods according to the embodiment described in the context of the FIG. 3. It is able to estimate or predict the quality function of a coated transparent substrate which comprises a transparent sodalime mineral glass as transparent substrate with a multi-layered coating as described in Table 1. The multi-layered coating is deposited on one of the main face of the transparent substrate. The non in-process measured quality function is chosen to be the solar light transmission coefficient. The in-process measured quality functions are transmission electromagnetic spectra.

TABLE 1

| Layer | Thickness (nm) |
|---|---|
| SiN | 45 |
| ZnO | 5 |
| Ag | 10 |
| SnZnO | 5 |
| SiN | 20 |
| Glass | 3.9 mm |

The values for layer thickness in Table 1 are target values for the production of real coated substrates with a given coating process such as illustrated in FIG. 2. During production, real values of thickness for each layer may depart from those in Table 1.

In the example, the method helps to check if the solar light transmission coefficient of the produced coated substrates fulfils a given specification despite these discrepancies. In this scope, it is shown thereafter that the method can estimate or predict the solar light transmission coefficient of coated substrates with high accuracy by comparing estimated values with measured values from real, i.e produced, coated substrates.

The mathematical model is computed from a machine learning Ridge regression analysis coded in Python from the Scikit-learn module. The machine learning Ridge regression analysis is trained with sets of training and target simulated data. The data is simulated with the following protocol.

First, 1000 samples of coated substrates are randomly simulated from the multi-layered coating of the Table 1 by changing the values of each layer by means of random variations that follow a standard normal distribution with an amplitude factor of 0.1. Second, the normalized transmission and reflection (glass and coating sides) electromagnetic spectrum of each sample is calculated between 380 and 980 nm with CODE from WTheiss Hardware and Software. As an illustration, FIG. 8 shows normalized transmission electromagnetic spectra of 10 randomly selected samples among the 1000 simulated samples. These 1000 calculated spectra form the set of training data.

The solar light transmission coefficient of each sample is also calculated with CODE from WTheiss Hardware and Software. The 1000 calculated solar light transmission coefficients form the set of target data.

Once the machine learning Ridge regression analysis is trained onto these sets of training and target data, the method can provide, as output, the solar light transmission coefficient of the coated substrates, from the normalized transmission electromagnetic spectrum of that coated substrates provided as input.

In order to evaluate the accuracy and the efficiency of the method, real, i.e. measured, normalized transmission electromagnetic spectra between 380 and 980 nm of 38 real, produced, samples of coated substrates are provided as input to the method in order to estimate or predict their respective solar light transmission coefficient. These 38 real samples are similar to the coated substrate described in Table 1 but show variations in the thickness of their layers comparing to those of the Table 1. The normalized transmission electromagnetic spectra of 38 real samples were measured with a spectrometer at the end of the coating process used to produce them. The real solar light transmission coefficient of each of these 38 samples were measured by means of a spectrometer.

Figure 9:
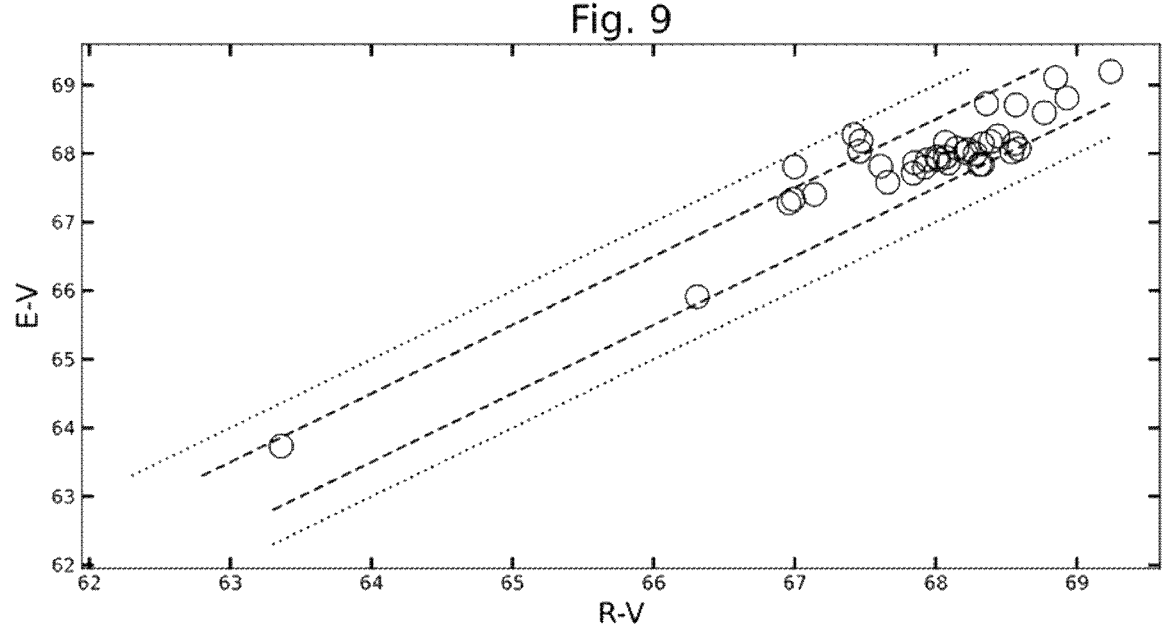
FIG. 9 is a data plot illustrating the confidence between estimated and measured values of an optical property.

FIG. 9 compares the real, i.e. measured, values (R-V) of solar light transmission coefficient of these 38 samples to those estimated (E-V) by the method. The dashed and dotted lines represent respectively the 0.5% and 1% confidence interval from a perfect match between an estimated value and the corresponding measured value.

FIG. 9 shows that 90% percent of the values estimated by the method are within 0.5% confidence interval, and that 100% of the estimated values are within the 1% confidence interval.

These results clearly demonstrate that the method according to the invention is able, to estimate accurately at least one non in-process measured quality function of given coated transparent substrates with a given coating process, without the need of online in-process real-time monitoring, collecting and processing of data related the quality functions of the coated substrate at different stages of the coating process, nor the need to collect samples, by cutting during the setup time and/or the production, to analyse them with measuring instruments after subsequent transformation, e.g. lamination, heating, tempering, before to be analysed.

The invention claimed is:

1. A computer implemented method for estimating at least one non in-process measured quality function of a coated transparent substrate wherein said coated transparent substrate comprises a transparent substrate with a layered coating on at least one of its main faces, said layered coating being deposited with a coating process, said method comprising:
providing, as input data, at least one in-process measured quality function of the coated transparent substrate as deposited, and providing, as output data, at least one non in-process measured quality function of said coated transparent substrate, and calculating said non in-process measured quality function from said input data using a mathematical model,
wherein said mathematical model is computed from a machine learning based regression analysis which is trained on a set of training data comprising in-process measured and/or simulated quality functions and a set of target data comprising non in-process measured and/or simulated quality functions,
wherein said in-process measured and/or simulated quality functions of the set of training data and said non in-process measured and/or simulated quality functions of the set of target data are respectively in-process measured and/or simulated quality functions and non in-process measured and/or simulated quality functions from previous coated transparent substrates which comprise transparent substrates and layered coating similar to those of to the coated transparent substrate respectively, said given layered coating being deposited in the coating process,
wherein said in-process measured and/or simulated quality functions of said set of training data and said non in-process measured and/or simulated quality function of said set of target data are respectively the same kind as the in-process measured quality function provided as input and non in-process measured quality function provided by said method as output.

2. Method The computer implemented method according to claim 1, wherein said method further comprises; providing as input data, at least one coating parameter of said given coating process, wherein the set of training data further comprises coating process parameters of the coating process, wherein said coating process parameters of said set of training data are coating process parameters from previous monitoring of said coating process during the coating of the previous coated transparent substrates, and wherein said coating parameters are of the same kind as the at least one coating parameter provided as input data.

3. The computer implemented method according to claim 1, wherein said method further comprises providing as input at least one physicochemical property of the transparent substrates and/or the layered coating, and wherein said set of training data further comprises physicochemical properties of same kind as the physicochemical property provided as input.

4. The computer implemented method according to claim 1, wherein the mathematical model is computed from a machine learning based regression analysis which is, first, trained on a set of simulated training data and a set of simulated target data, and which is, then, trained again on a set of measured training data and a set of measured target data.

5. The computer implemented method according to claim 1, wherein the machine learning based regression analysis is a Ridge regression, a Random Forest regression a decision tree regression, a gradient regression, a support vector machine regression, a Lasso regression or a neural network based regression analysis.

6. The computer implemented method according to claim 1, wherein the in-process measured quality function is measured at some location of the coating process.

7. The computer implemented method according to claim 6, wherein the in-process measured quality function is a transmission and/or reflection electromagnetic spectrum.

8. The computer implemented method according to claim 7, wherein the electromagnetic spectrum is transmission and/or reflection spectrum with an observation angle equal to or less than 10° or with an observation angle more than 45°, in the 295 nm-2000 nm wavelength range.

9. The computer implemented method according to claim 8, wherein the electromagnetic spectrum is transmission and/or reflection spectrum with an observation angle equal to or less than 10° or with an observation angle more than 45°, in the 330 nm-1100 nm wavelength range.

10. The computer implemented method according to claim 6, wherein the in-process measured quality function is measured at the end of the coating process.

11. The computer implemented method according to claim 1, wherein the in-process measured quality function is an optical, electrical, mechanical or electrical property.

12. The computer implemented method according to claim 1, wherein the transparent substrate is a mineral glass substrate or an organic substrate.

13. The computer implemented method according to claim 1, wherein the layered coating is a multi-layered coating comprising at least one dielectric layer and one functional metallic layer.

14. The computer implemented method according to claim 1, wherein the non in-process measured quality functions are optical properties.

15. The computer implemented method according to claim 14, wherein the optical properties include solar gain, light transmission coefficient, light reflection coefficient and/or colour, and homogeneity thereof.

16. The computer implemented method according to claim 1, wherein the non in-process measured quality function is a quality function of said coated transparent substrate when said coated transparent substrate is part of a glazing.

17. A non-transitory computer readable medium comprising instructions which, when executed by a computer, cause the computer to carry out a method according to claim 1.

18. A coating process of a layered coating on a transparent substrate, comprising:

coating a layered coating on a transparent substrate, estimating at least one non in-process measured quality function of the coated transparent substrate with a computer implemented method according to claim 1, and providing, as input data to said computer implemented method, at least one in-process measured quality function of the coated substrate acquired at any location of the coating process.

* * * * *